United States Patent
Nakayama (10) Patent No.: US 8,695,575 B2
(45) Date of Patent: Apr. 15, 2014

(54) CONTROL DEVICE FOR INTERNAL COMBUSTION ENGINE

(75) Inventor: Yusuke Nakayama, Gotemba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/509,751

(22) PCT Filed: Mar. 23, 2010

(86) PCT No.: PCT/JP2010/054929
§ 371 (c)(1),
(2), (4) Date: May 14, 2012

(87) PCT Pub. No.: WO2011/117960
PCT Pub. Date: Sep. 29, 2011

(65) Prior Publication Data
US 2012/0318248 A1 Dec. 20, 2012

(51) Int. Cl.
F02B 13/00 (2006.01)

(52) U.S. Cl.
USPC .............................. 123/575; 123/525; 123/576

(58) Field of Classification Search
USPC .................. 123/1 A, 525, 575, 576, 577, 578
See application file for complete search history.

(56) References Cited

U.S. PATENT DOCUMENTS

| | | | | |
|---|---|---|---|---|
| 4,489,699 A | * | 12/1984 | Poehlman | 123/525 |
| 4,576,137 A | * | 3/1986 | Tanaka | 123/575 |
| 4,606,322 A | * | 8/1986 | Reid et al. | 123/575 |
| 5,357,908 A | * | 10/1994 | Sung et al. | 123/3 |
| 5,546,908 A | * | 8/1996 | Stokes | 123/480 |
| 6,508,225 B1 | * | 1/2003 | Hiki | 123/198 D |
| 6,543,395 B2 | * | 4/2003 | Green | 123/27 GE |
| 7,769,523 B2 | * | 8/2010 | Matsushima et al. | 701/103 |
| 2002/0134362 A1 | * | 9/2002 | Deutsch | 123/575 |
| 2006/0101823 A1 | | 5/2006 | Takemoto et al. | |
| 2008/0289599 A1 | | 11/2008 | Kurotani et al. | |
| 2009/0205622 A1 | * | 8/2009 | Kawakita et al. | 123/672 |
| 2009/0271096 A1 | * | 10/2009 | Matsubara | 701/113 |
| 2012/0186560 A1 | * | 7/2012 | Lund | 123/495 |
| 2012/0291758 A1 | * | 11/2012 | Saito | 123/515 |

FOREIGN PATENT DOCUMENTS

| | | | |
|---|---|---|---|
| JP | 62-096742 A | | 5/1987 |
| JP | 11-166432 A | | 6/1999 |
| JP | 2001-193511 A | | 7/2001 |
| JP | 2006-161804 A | | 6/2006 |
| JP | 2006-200438 A | | 8/2006 |
| JP | 2007-085203 A | | 4/2007 |
| JP | 2008-291716 A | | 12/2008 |
| JP | 2011163155 A | * | 8/2011 |

OTHER PUBLICATIONS

JP2011-163155 Machine Translation.*
International Search Report of PCT/JP2010/054929, dated Apr. 20, 2010.

* cited by examiner

Primary Examiner — Noah Kamen
Assistant Examiner — Long T Tran
(74) Attorney, Agent, or Firm — Sughrue Mion, PLLC (57) ABSTRACT

A control device for an internal combustion engine includes an engine and a control unit. The engine can switch fuel to be used among plural kinds of fuel. The control unit delays a timing of switching the fuel to a timing of around a fuel cut in a case where switching the fuel is requested.

4 Claims, 5 Drawing Sheets

CONTROL DEVICE FOR INTERNAL COMBUSTION ENGINE

CROSS REFERENCE TO RELATED APPLICATIONS

This application is a National Stage of International Application No. PCT/JP2010/054929 filed Mar. 23, 2010, the contents of all of which are incorporated herein by reference in their entirety.

TECHNICAL FIELD

The present invention relates to control of a vehicle including an internal combustion engine (an engine).

BACKGROUND TECHNIQUE

Conventionally, there is known a bifuel vehicle which switches between the use of gas fuel such as CNG (Compressed Natural Gas) and the use of liquid fuel in order to realize the low emission. For example, in Patent Reference-1, there is disclosed a technique which switches the fuel from gasoline to the gas fuel in addition to the fuel cut so that the supply of gasoline to the engine is stopped in response to the satisfaction of a predetermined switching condition for switching the fuel from gasoline to the gas fuel and that the gas fuel is supplied to the engine after a predetermined duration has passed. In Patent Reference-2, there is disclosed a technique which is related to the present invention.
Patent Reference-1: Japanese Patent Application Laid-open under No. 2006-161804
Patent Reference-2: Japanese Patent Application Laid-open under No. S62-096742

DISCLOSURE OF INVENTION

Problem to be Solved by the Invention

According to the technique disclosed in Patent Reference-1, it is necessary to execute the fuel cut at the time of switching the fuel, and there is a possibility of deteriorating the drivability and the emission. In contrast, a particular device and/or control are needed in order to suppress the deterioration of the drivability and the deterioration of the emission due to the fuel cut executed at the time of switching the fuel.

The present invention has been achieved in order to solve the above problem. It is an object of this invention to provide a control device for an internal combustion engine capable of suppressing the deterioration of the drivability at the time of switching the fuel.

Means for Solving the Problem

According to one aspect of the present invention, there is provided a control device for an internal combustion engine, including: an engine which can switch fuel to be used among plural kinds of fuel; and a control unit which delays a timing of switching the fuel to a timing around a fuel cut in a case where switching the fuel is requested.

The above control device for an internal combustion engine includes an engine and a control unit. The engine can switch fuel to be used among plural kinds of fuel. The control unit is an ECU (Electronic Control Unit) for example, and it delays a timing of switching the fuel to a timing around the fuel cut in a case where switching the fuel is requested. In other words, when switching the fuel is requested, the control device for an internal combustion engine does not immediately switch the fuel but switches the fuel at the time around the fuel cut. The expression "switches the fuel at the time around the fuel cut" herein indicates changing the fuel used after the fuel cut from the fuel used before the fuel cut. In this way, by switching the fuel at the time around the fuel cut, the control device for an internal combustion engine can suppress the deterioration of the drivability and the deterioration of the emission due to switching the fuel. Compared to the case where switching the fuel is executed immediately after the request for switching the fuel, the control device for an internal combustion engine can also suppress the deterioration of the drivability due to the expansion of the duration of the fuel cut.

In a manner of the control device for an internal combustion engine, the control unit compulsorily switches the fuel when the fuel cut has not been executed within a predetermined duration after the request for switching the fuel. Thereby, the control device for an internal combustion engine can prevent switching the fuel from being excessively delayed due to the inexecution of the fuel cut, and it can also suppress the deterioration of the emission and the deterioration of the fuel due to the inexecution of switching the fuel.

In another manner of the control device for an internal combustion engine, the predetermined duration is determined based on emission, fuel efficiency and/or remaining amount of the fuel to be consumed, which are estimated based on an operation state of the engine. Concretely, the term "remaining amount of the fuel to be consumed" herein indicates the remaining amount of the fuel which is supplied to the engine in the delay period of switching the fuel. Generally, depending on the operation state of the engine, the emission associated with the delay of switching the fuel, the fuel efficiency, and remaining amount of the fuel to be consumed vary. Therefore, by determining the above-mentioned predetermined duration based on the operation state of the engine, the control device for an internal combustion engine can limit the length of the delay time of switching the fuel so that the emission, the fuel efficiency and the remaining amount of the fuel to be consumed are within a tolerable range.

In still another manner of the control device for an internal combustion engine, the control unit does not switch the fuel when a continuous time length of executing the fuel cut is shorter than a predetermined continuous time length. In a case where a continuous time length of the fuel cut is short, the previously-used fuel remaining in the engine is not scavenged thereby to be likely to deteriorate the combustion. Therefore, in this manner, by not switching the fuel in the case where the continuous time length of executing the fuel cut is shorter than the predetermined continuous time length, the control device for an internal combustion engine can eliminate the influence caused by the remaining fuel used before switching the fuel.

In still another manner of the control device for an internal combustion engine, the predetermined time length is determined based on an operation state of the engine. The term "operation state of the engine" herein includes the intake air amount and the temperature of the engine, for example. Generally, depending on the operation state of the engine such as the intake air amount and the temperature of the engine, the influence caused by the remaining fuel varies. Therefore, by determining the above-mentioned predetermined time length based on the operation state of the engine, the control device for an internal combustion engine can smoothly switch the fuel.

DETAILED DESCRIPTION OF THE PREFERRED EMBODIMENTS

Preferred embodiments of the present invention will be explained hereinafter with reference to the drawings.

[Schematic Configuration of Internal Combustion Engine]

Figure 1:
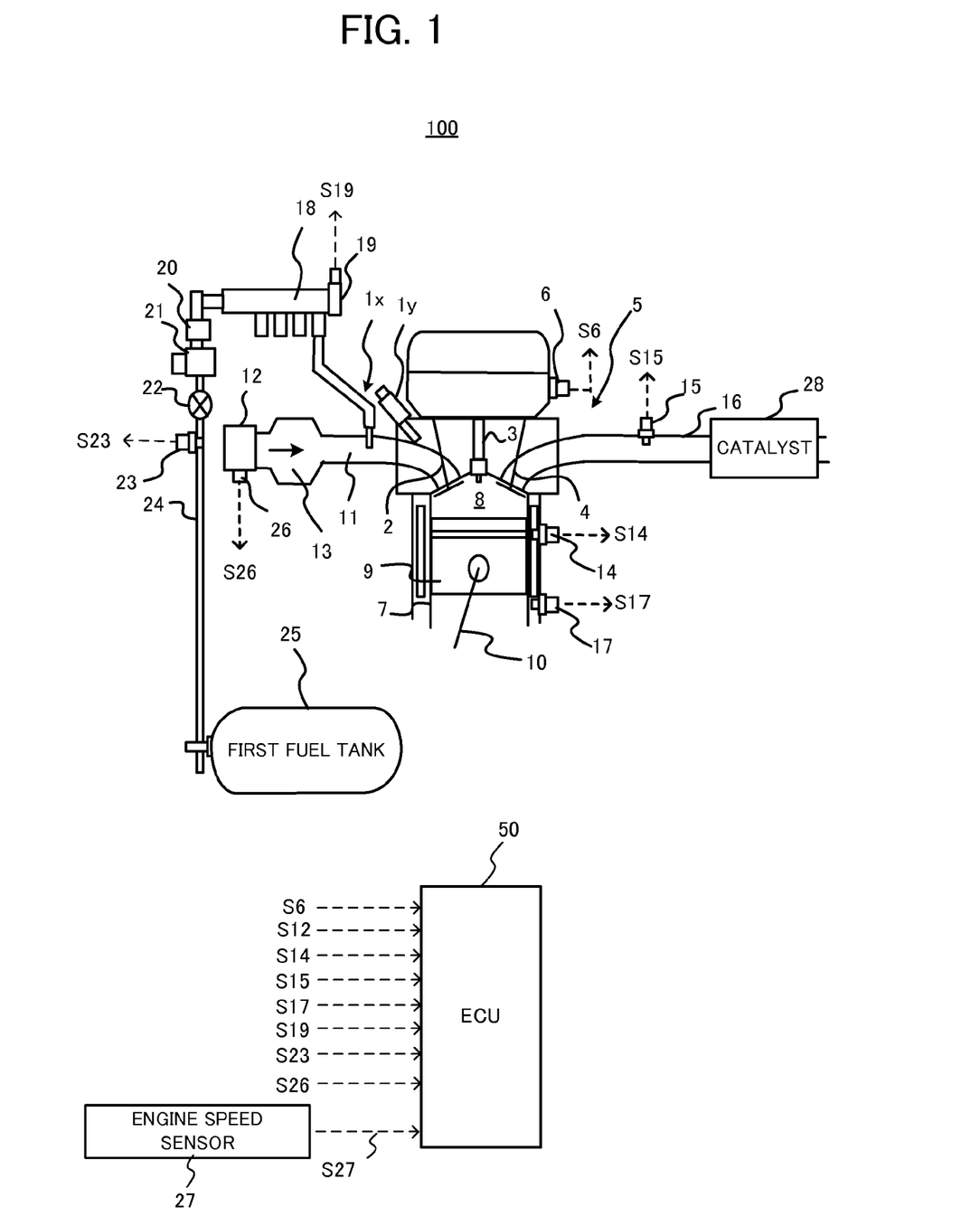
FIG. 1 is an example of a configuration of an internal combustion engine.

FIG. 1 shows a schematic configuration diagram of an internal combustion engine (engine) 100 to which the control device for an internal combustion engine according to the present invention is applied. The solid arrows show examples of flows of gas in the figure.

The internal combustion engine 100 mainly includes a first fuel injection valve 1x, a second fuel injection valve 1y, an intake valve 2, a sparking plug 3, an exhaust valve 4, a cylinder head 5, a cam angle sensor 6, a cylinder 7, a combustion chamber 8, a piston 9, a connecting rod 10, an intake passage 11, an electronic throttle valve 12, a surge tank 13, a water temperature sensor 14, an A/F sensor 15, an exhaust passage 16, a knocking sensor 17, a fuel delivery pipe 18, a gas temperature sensor 19, an oil separator 20, a regulator 21, an isolation valve 22, a gas pressure sensor 23, a fuel passage 24, a first fuel tank 25, a throttle position sensor 26, an engine speed sensor 27, a catalyst 28, and an ECU 50. It is noted that the internal combustion engine 100 practically includes plural cylinders 7 though only one cylinder 7 is shown in FIG. 1 for convenience of explanation.

The intake air (air), which is drawn in from the external, passes through the intake passage 11, and the electronic throttle valve 12 adjusts the flow amount of the intake air which passes through the intake passage 11. The opening degree (hereinafter referred to as "throttle opening degree") of the electronic throttle valve 12 is controlled by the control signal supplied from the ECU 50. The surge tank 13, which is provided on the intake passage 11, stores the air (intake air) and distributes the intake air to each of the combustion chambers 8 of the cylinders via intake ports. The combustion chamber 8 is supplied with the fuel which is injected by the first injection valve (injector) 1x and the second injection valve 1y.

Under the control of the ECU 50, the first injection valve 1x injects CNG (Compressed Natural Gas) which is the gas fuel stored in the first fuel tank 25. Under the control of the ECU 50, the second injection valve 1y injects the liquid fuel stored in the second fuel tank which is not shown. Here, the liquid fuel may be gasoline, light oil, alcohol such as methanol and ethanol, and mixed fuel of them, for example.

In addition, the intake valve 2 and the exhaust valve 4 are provided in the combustion chamber 8. The intake valve 2 controls the flow and cutoff between the intake passage 11 and the combustion chamber 8 by opening and closing. The exhaust valve 4 controls the flow and cutoff between the exhaust passage 16 and the combustion chamber 8 by opening and closing. The opening timings, the closing timings, and the lift amounts of the intake valve 2 and the exhaust valve 4 are controlled by the cam shafts which are not shown. The cam angle sensor 6 detects the angle (phase) of the cam shaft and provides the detection signal S6 to the ECU 50.

In the combustion chamber 8, the gaseous mixture of the intake air and the fuel, which are supplied in the intake stroke as described above, is combusted by the ignition of the sparking plug 3 after the compression stroke. In this case, the piston 9 is reciprocated by the combustion, then the force of the reciprocation is transmitted to the crank shaft (not shown) via the connecting rod 10, and then the crank shaft rotates. The exhaust gas generated by the combustion in the combustion chamber 8 is discharged to the exhaust passage 16 in the exhaust stroke.

On the exhaust passage 16, there are provided the A/F sensor 15 and the catalyst 28. The A/F sensor 15 generates an output voltage proportional to the air fuel ratio (hereinafter referred to as "air fuel ratio AF") of the combusted gaseous mixture. The output voltage of the A/F sensor 15 is supplied to the ECU 50 by the detection signal S15. In addition, the water temperature sensor 14 and the knocking sensor 17 are provided on the engine block. The water temperature sensor 14 detects the water temperature (hereinafter referred to as "engine water temperature Thw") of the coolant in the water jacket. The water temperature sensor 14 supplies the detection signal S14 corresponding to the engine water temperature Thw to the ECU 50. The knocking sensor 17 detects a knocking on the basis of a vibration of the cylinder block. The knocking sensor 17 supplies the detection signal S17 to the ECU 50.

Meanwhile, on the fuel passage 24 connected to the first fuel tank 25, there are provided the gas pressure sensor 23, the isolation valve 22, the regulator 21, and the oil separator 20. The gas pressure sensor 23 detects the gas pressure corresponding to the fuel pressure in the fuel passage 24 and supplies the detection signal S23 thereof to the ECU 50. The isolation valve 22 controls the flow and cutoff in the fuel passage 24 under the control of the ECU 50. The regulator 21 is a mechanism which keeps the fuel pressure constant. The oil separator 20 separates impurities from the fuel passing through the fuel passage 24 and supplies the fuel delivery pipe 18 with the fuel from which the impurities is removed. The fuel delivery pipe 18 distributes the fuel supplied from the fuel passage 24 to the first fuel injection valves 1x each of which corresponds to each of the cylinders 7. In addition, on the fuel delivery pipe 18, there is provided the gas pressure sensor 19 which detects the gas pressure (fuel pressure) in the fuel delivery pipe 18. The gas pressure sensor 19 supplies the ECU 50 with the detection signal S19 corresponding to the gas pressure.

The engine speed sensor 27 generates output pulses indicating the engine speed (hereinafter referred to as "engine speed Ne"). The engine speed sensor 27 supplies the output pulses to the ECU 50 by the detection signal S27.

The ECU 50 includes a CPU (Central Processing Unit), a ROM (Read Only Memory), and a RAM (Random Access Memory), and executes various control of each component in the internal combustion engine 100. For example, the ECU 50 executes the control over the first and the second fuel injection valves 1x, 1y on the basis of the detection signals supplied as described above. Especially, the ECU 50 controls the timing of switching the fuel (hereinafter simply referred to as "switching the fuel") from the liquid fuel to CNG or from CNG to the liquid fuel. In this way, the ECU 50 functions as a control unit in the present invention.

Hereinafter, the term "CNG operation" indicates the operation in which the fuel injection is executed by the first fuel injection valve 1x, i.e., the operation in which the CNG is used as a power source, and the term "liquid fuel operation" indicates the operation in which the fuel injection is executed by the second fuel injection valve 1y, i.e., the operation in which the liquid fuel is used as a power source. The term "fuel cut" herein indicates stopping the fuel injection to the cylinders 7. Besides, the term "return from the fuel cut" herein indicates restarting the fuel injection from a state of the fuel cut.

Hereinafter, a concrete description will be given of the control executed by the ECU 50 in the first embodiment to the third embodiment.

First Embodiment

In the first embodiment, in case of switching the fuel, the ECU 50 delays the timing of switching the fuel to around the time of the fuel cut, which is executed based not on the request for switching the fuel. Thereby, the ECU 50 suppresses the deterioration of the emission and the deterioration of the drivability due to switching the fuel.

The concrete description thereof will be given below. First, the ECU 50 determines whether or not there exists a request to switch the fuel while it executes the liquid fuel operation or the CNG operation. For example, the ECU 50 executes the CNG operation in the period passing from the start of the internal combustion engine 100 until the catalyst 28 has been warmed up, and in other operating range where the emission is likely to deteriorate by use of the liquid fuel. In the period other than the above-mentioned period and in the operating range other than the above-mentioned operating range, the ECU 50 executes the liquid fuel operation. Concretely, the ECU 50 determines which of the liquid fuel operation or the CNG operation should be executed, on the basis of the temperature of the catalyst 28, the engine speed Ne, the operation state of the internal combustion engine 100 such as the intake air amount with reference to a predetermined map. Then, the ECU 50 switches the fuel if necessary based on the above-mentioned determination.

When the ECU 50 determines that switching the fuel should be executed, it switches the fuel around the time of the fuel cut. In other words, the ECU 50 controls the first and the second fuel injection valves 1x and 1y so that the fuel to be used is switched around the time of the fuel cut. More concretely, in a case where the ECU 50 executes the fuel supply of the liquid fuel for each cylinder 7 before the fuel cut, it executes the fuel supply of CNG for each cylinder 7 at the time of the return from the fuel cut. Similarly, in a case where the ECU 50 executes the fuel supply of CNG for each cylinder 7 before the fuel cut, it executes the fuel supply of the liquid fuel for each cylinder 7 at the time of the return from the fuel cut. Here, the ECU 50 executes the fuel cut based not on the request for switching the fuel. Namely, the ECU 50 executes the fuel cut at the timing which is independent of the timing of the request for switching the fuel. Thereby, the ECU 50 can suppress the deterioration of the emission and the deterioration of the drivability due to switching the fuel.

Figure 2:
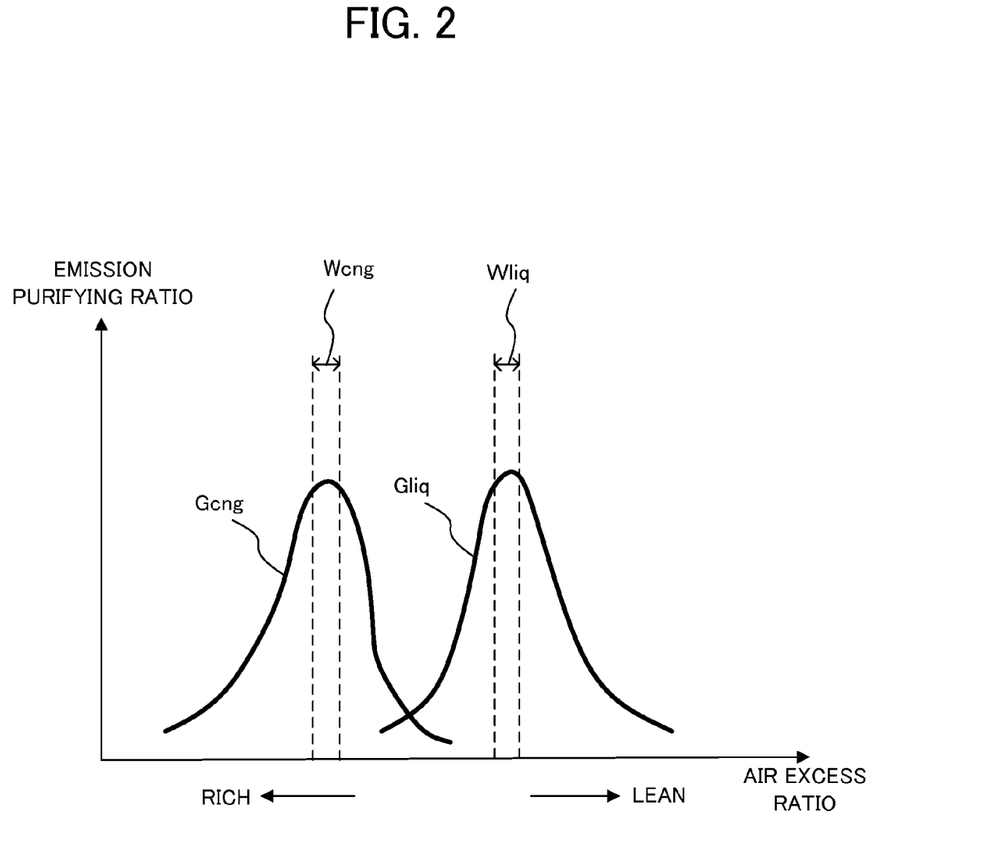
FIG. 2 is a map showing a relationship between an emission purifying ratio and an air excess ratio with respect to CNG and the liquid fuel.

Next, a supplementary explanation will be given of the effect of the first embodiment with reference to FIGS. 2 and 3. FIG. 2 shows a relationship between an air excess ratio and an "emission purifying ratio" which indicates a purifying ratio of compounds in the exhaust gas at each time of the CNG operation and the liquid fuel operation. In FIG. 2, the graph "Gcng" shows a relationship between the air excess ratio and the emission purifying ratio at the time of the CNG operation, and the graph "Gliq" shows a relationship between the air excess ratio and the emission purifying ratio at the time of the liquid fuel operation. The predetermined range "Wcng" in the air excess ratio indicates a target range of the air excess ratio at the time of the CNG operation. Similarly, the predetermined range "Wliq" in the air excess ratio indicates a target range of the air excess ratio at the time of the liquid fuel operation. Namely, the range Wcng and the range Wliq indicate the ranges of the air excess ratio where the emission purifying ratio exists near the maximum values in the graph Gcng and the graph Gliq.

As shown in FIG. 2, the target range of the air excess ratio at the time of the CNG operation is different from the target range of the air excess ratio at the time of the liquid fuel operation. Therefore, in a case (hereinafter referred to as "comparative example") that the ECU 50 switches the fuel while supplying the fuel, at the time of switching the fuel, the ECU 50 needs to use the air excess ratio corresponding to a low emission purifying ratio, which corresponds to the value between the range Wcng and the range Wliq. Thus, in the comparative example, there is a possibility that the ECU 50 deteriorates the emission at the time of switching the fuel.

In contrast, according to the first embodiment, the ECU 50 switches the fuel around the time of the fuel cut. Therefore, in this case, the ECU 50 can avoid using the air excess ratio corresponding to the low emission purifying ratio, which corresponds to the value between the range Wcng and the range Wliq. In other words, according to the first embodiment, the ECU 50 can suppress the deterioration of the emission due to switching the fuel. Besides, by delaying the timing of switching the fuel to around the time of the fuel cut, the ECU 50 can suppress the deterioration of the drivability and the deterioration of the emission associated with the fuel cut in comparison to the case where the fuel cut is compulsorily executed according to the request for switching the fuel.

In the comparative example, since the ECU 50 switches the fuel at the time of the fuel supply, there is a possibility that a sudden change in the engine torque around the time of switching the fuel occurs. In contrast, according to the first embodiment, since the ECU 50 switches the fuel around the time of the fuel cut, the sudden change in the engine torque due to switching the fuel does not occur. Namely, in this case, by switching the fuel around the time of the fuel cut when the engine torque is not generated, the ECU 50 can prevent the influence caused by the sudden change in the engine torque.

(Process Flow)

Figure 3:
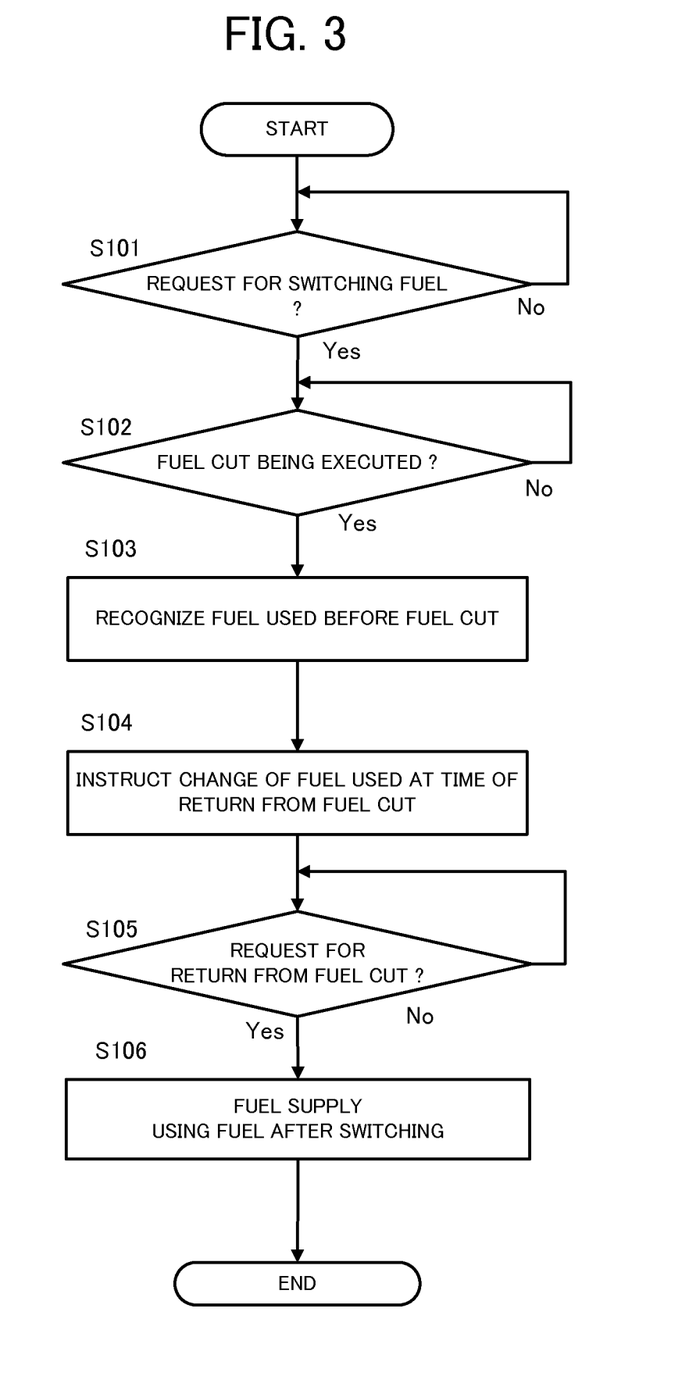
FIG. 3 is an example of a flowchart showing a procedure of the process according to the first embodiment.

FIG. 3 is one example of a flowchart showing a procedure of the process according to the first embodiment. The flowchart shown in FIG. 3 is repeatedly executed by the ECU 50 in a predetermined cycle.

First, the ECU 50 determines whether or not switching the fuel is requested (step S101). Concretely, based on conditions of the vehicle such as the temperature of the catalyst 28, the engine water temperature Thw, the engine speed Ne and the intake air amount, the ECU 50 determines whether or not switching the fuel is needed. When the ECU 50 determines that switching the fuel is requested (step S101: Yes), it proceeds with the process at step S102. In contrast, when the ECU 50 determines that switching the fuel is not requested (step S101: No), it continues to monitor whether or not switching the fuel is requested.

Next, the ECU 50 determines whether or not the fuel cut is being executed (step S102). Concretely, based on the fuel injection quantities injected by the first fuel injection valve 1x and the second fuel injection valve 1y and/or air fuel ratio, the ECU 50 determines whether or not the fuel cut is being executed. When the ECU 50 determines that the fuel cut is being executed (step S102: Yes), it executes the process at step S103 and the following processes. In contrast, when the ECU 50 determines that the fuel cut is not being executed (step S102: No), it continues to monitor whether or not the fuel cut is being executed.

When the ECU 50 determines that the fuel cut is being executed, it recognizes the fuel used before the fuel cut (step S103). Namely, the ECU 50 recognizes whether the fuel supplied to each cylinder 7 before the fuel cut is the liquid fuel or CNG.

Next, the ECU 50 instructs the change of the fuel to be used at the time of the return from the fuel cut (step S104). In other words, when the ECU 50 used the liquid fuel before the fuel cut, for example, it sets the fuel to be used at the time of the return from the fuel cut to CNG. In contrast, when the ECU 50 used CNG before the fuel cut, it sets the fuel to be used at the time of the return from the fuel cut to the liquid fuel.

Then, the ECU 50 determines whether or not the return from the fuel cut is requested (step S105). Namely, the ECU 50 determines whether or not it should restart the fuel supply to each cylinder 7. When the ECU 50 determines that the return from the fuel cut is requested (step S105: Yes), it executes the fuel supply using the fuel after the switching (step S106). Namely, in this case, the ECU 50 supplies the fuel designated at step S104 to each cylinder 7. Thereby, the ECU 50 can suppress the deterioration of the emission due to switching the fuel and the deterioration of the drivability.

In contrast, when the ECU 50 determines that the return from the fuel cut is not requested (step S105: No), it continues to determine whether or not the return from the fuel cut is requested.

Second Embodiment

According to the second embodiment, in addition to the first embodiment, the ECU 50 compulsorily switches the fuel when the fuel cut has not been executed within a predetermined duration passing after the request for switching the fuel. Thereby, the ECU 50 suppresses the deterioration of the fuel efficiency and the deterioration of the emission due to not switching the fuel.

The concrete description thereof will be given below. If the ECU 50 determines that switching the fuel is requested based on the conditions of the vehicle, the ECU 50 monitors whether or not the fuel cut is being executed. Hereinafter, a time length of continuing to monitor whether or not the fuel cut is being executed after the request for switching the fuel is referred to as "delay time length Tdw". Then, the ECU 50 compulsorily switches the fuel when the delay time length Tdw is longer than a predetermined time length (hereinafter, referred to as "threshold Tdwth"). Namely, in this case, the ECU 50 switches the fuel regardless of whether or not the fuel cut is executed.

Here, a description will be given of the threshold Tdwth. The threshold Tdwth is determined in consideration of emission estimated from the operation state of the internal combustion engine 100, the fuel efficiency, and/or the remaining quantity (hereinafter simply referred to as "fuel remaining quantity") of the fuel used for the period of the delay time length Tdw. Concretely, the threshold Tdwth is set to the upper limit value of the delay time length Tdw in which the emission, the fuel efficiency, and/or the fuel remaining quantity are within their tolerable ranges. The operation state of the internal combustion engine 100 herein includes the temperature of the catalyst 28, the load of the engine, the engine speed Ne, the engine water temperature Thw, the intake air quantity and the fuel quantity remaining in the first fuel tank 25 or the second fuel tank.

Then, the ECU 50 sets the threshold Tdwth based on the operation state of the internal combustion engine 100 with reference to a map, for example. Concretely, the above-mentioned map is a map indicating the correspondence between each operation state of the internal combustion engine 100 and the threshold Tdwth compatible with each of the operation state. The map is prepared in advance by experimental trials and stored in the memory of the ECU 50. In this way, by setting the threshold Tdwth based on the operation state of the internal combustion engine 100, the ECU 50 prevents the delay time length Tdw from becoming excessively long thereby to suppress the deterioration of the fuel efficiency, the deterioration of the emission, and the excessive lowering of the fuel remaining quantity.

(Process Flow)

Figure 4:
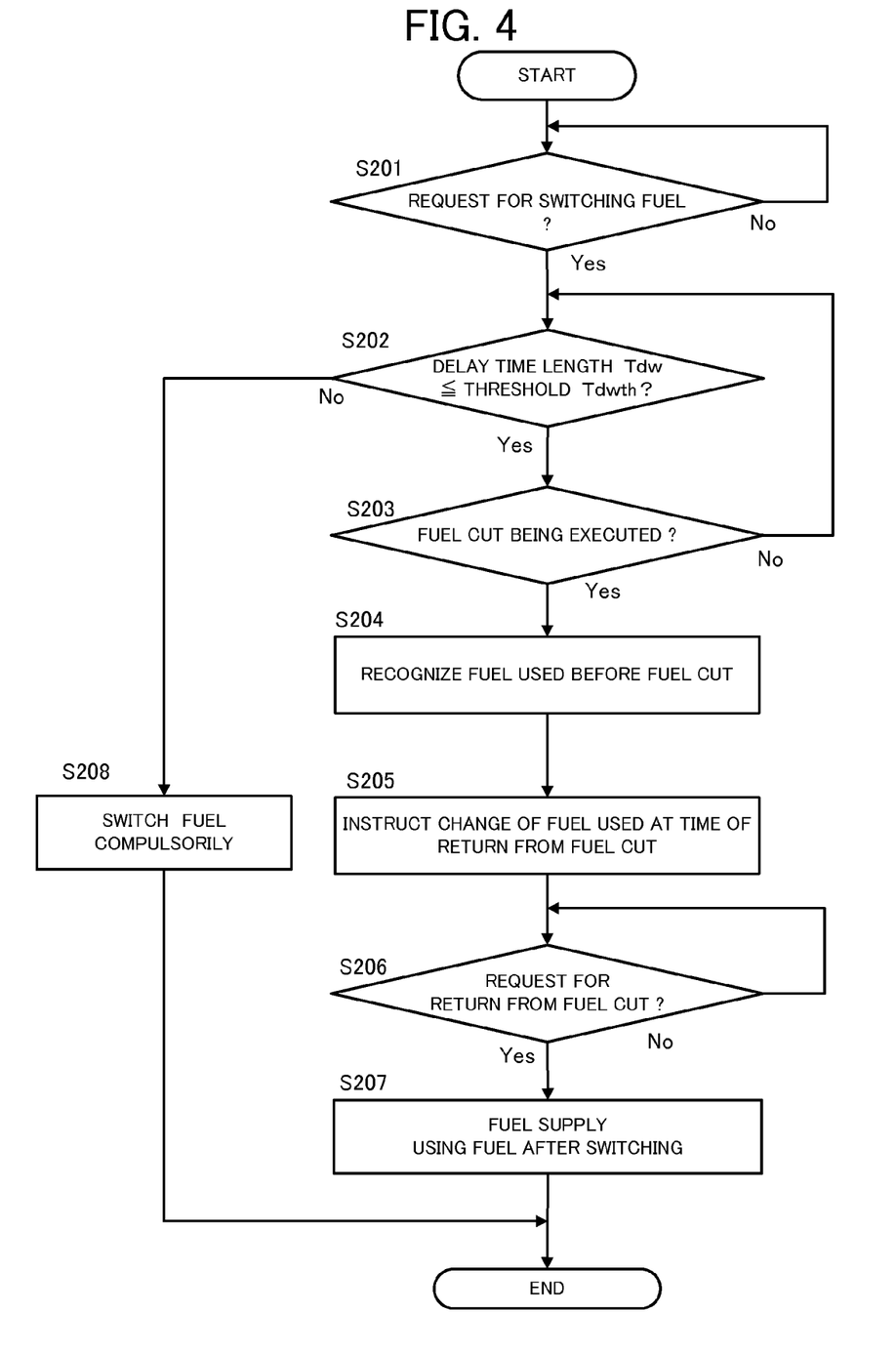
FIG. 4 is an example of a flowchart showing a procedure of the process according to the second embodiment.

Next, a description will be given of a procedure of the process executed by the ECU 50 according to the second embodiment. FIG. 4 is one example of a flowchart showing the procedure of the process executed by the ECU 50 according to the second embodiment. The ECU 50 repeatedly executes the process of the flowchart shown in FIG. 4 in a predetermined cycle.

First, the ECU 50 determines whether or not switching the fuel is requested (step S201). When the ECU 50 determines that switching the fuel is requested (step S201: Yes), it proceeds with the process at step S202. In contrast, when the ECU 50 determines that switching the fuel is not requested (step S201: No), it continues to monitor whether or not switching the fuel is requested.

Next, the ECU 50 determines whether or not the delay time length Tdw is equal to or shorter than the threshold Tdwth (step S202). Concretely, the ECU 50 calculates the time length from the time of the request for switching the fuel at step 201 to the present time as the delay time length Tdw, and it also calculates the threshold Tdwth based on the operation state of the internal combustion engine 100.

When the delay time length Tdw is equal to or shorter than the threshold Tdwth (step S202: Yes), the ECU 50 proceeds with the process at step S203. In other words, in this case, the ECU 50 determines that the delay time length Tdw is short enough to be unlikely to cause the deterioration of the emission, the deterioration of the fuel efficiency and the excessive lowering of the fuel remaining quantity.

In contrast, when the ECU 50 determines that the delay time length Tdw is neither equal to nor shorter than the threshold Tdwth (step S202: No), i.e., it determines that the delay time length Tdw is longer than the threshold Tdwth, it compulsorily switches the fuel (step S208). Namely, in this case, the ECU 50 determines that it is likely to cause the deterioration of the emission, the deterioration of the fuel efficiency and/or the excessive lowering of the fuel remaining quantity if switching the fuel is delayed any longer. Thereby, the ECU 50 can suppress the deterioration of the emission, the deterioration of the fuel efficiency and/or the excessive lowering of the fuel remaining quantity.

Next, at step S203, the ECU 50 determines whether or not the fuel cut is being executed (step S203). When the ECU 50 determines that the fuel cut is being executed (step S203: Yes), it executes the processes at step S204 to step S207. Namely, in this case, the ECU 50 switches the fuel according to the timing of the return from the fuel cut. Concretely, the ECU 50 recognizes the fuel used before the fuel cut (step S204). Then, the ECU 50 instructs the change of the fuel to be used at the time of the return from the fuel cut (step S205). Next, the ECU 50 determines whether or not the return from the fuel cut is requested (step S206). When the ECU 50 determines that the return from the fuel cut is requested (step S206: Yes), it executes the fuel supply using the fuel after the switching (step S207). Namely, in this case, the ECU 50 supplies the fuel designated at step S205 to each cylinder 7. Thereby, the ECU 50 can suppress the deterioration of the emission due to the fuel switching and the deterioration of the drivability. In contrast, the ECU 50 determines that the return from the fuel cut is not requested (step S206: No), it continues to determine whether or not the return from the fuel cut is requested.

In contrast, when the ECU 50 determines that the fuel cut is not being executed (step S203: No), it proceeds with the process at step S202 again, and continues to monitor whether or not the delay time length Tdw is longer than the threshold Tdwth.

As described above, the ECU 50 switches the fuel around the time of the fuel cut only in the case where the delay time length Tdw is not longer than the threshold Tdwth. Thereby, the ECU 50 can suppress the deterioration of the emission and the deterioration of the fuel efficiency due to the excessive delay of switching the fuel. By switching the fuel around the time of the fuel cut in principle, the ECU 50 can also suppress the deterioration of the emission and the deterioration of the drivability due to switching the fuel.

Third Embodiment

According to the third embodiment, instead of the first embodiment or the second embodiment, or in addition to these embodiments, the ECU 50 does not switch the fuel when the time length (hereinafter referred to as "fuel cut time length Tfw") of the duration of the fuel cut is shorter than a predetermined time length (hereinafter referred to as "threshold Tfwth"). Thereby, the ECU 50 eliminates the influence of the remaining fuel in the intake pipes and the cylinders 7.

The concrete description thereof will be given below. When the fuel cut is started after the request for switching the fuel, the ECU 50 measures the time passing after the start of the fuel cut. Then, the ECU 50 calculates the time length from the start time of the fuel cut to the time of the request for the return from the fuel cut as the fuel cut time length Tfw. When the fuel cut time length Tfw is shorter than the threshold Tfwth, the ECU 50 does not switch the fuel inconsideration of the influence caused by the fuel (hereinafter simply referred to as "remaining fuel") remaining in the intake pipes and the cylinders 7 out of the fuel supplied before the fuel cut. Namely, in this case, the ECU 50 determines that the combustion is likely to deteriorate due to the influence caused by the remaining fuel if the ECU 50 switches the fuel. Therefore, by switching the fuel only in the case where the fuel cut time length Tfw is equal to or longer than the threshold Tfwth, the ECU 50 certainly eliminates the influence caused by the remaining fuel thereby to suppress the deterioration of the combustion.

Next, The threshold Tfwth will be described below. In consideration of the influence caused by the remaining fuel, the threshold Tfwth is determined based on the operation state of the internal combustion engine 100. Concretely, the operation state of the internal combustion engine 100 herein includes the intake air amount and the temperature of the internal combustion engine 100.

In other words, the ECU 50 determines that a proper value of the threshold Tfwth is different depending on the operation state of the internal combustion engine 100 such as the intake air amount. Therefore, based on the operation state of the internal combustion engine 100, the ECU 50 determines the threshold Tfwth with reference to a map, for example. The above-mentioned map is a map indicating the correspondence between each operation state of the internal combustion engine 100 and the threshold Tfwth compatible with the operation state, and it is prepared in advance by experimental trials and stored in the memory of the ECU 50, for example.

In this way, the ECU 50 can set the proper threshold Tfwth according to the operation state of the internal combustion engine 100 such as the intake air amount thereby to smoothly switch the fuel while eliminating the influence caused by the remaining fuel.

(Process Flow)

Figure 5:
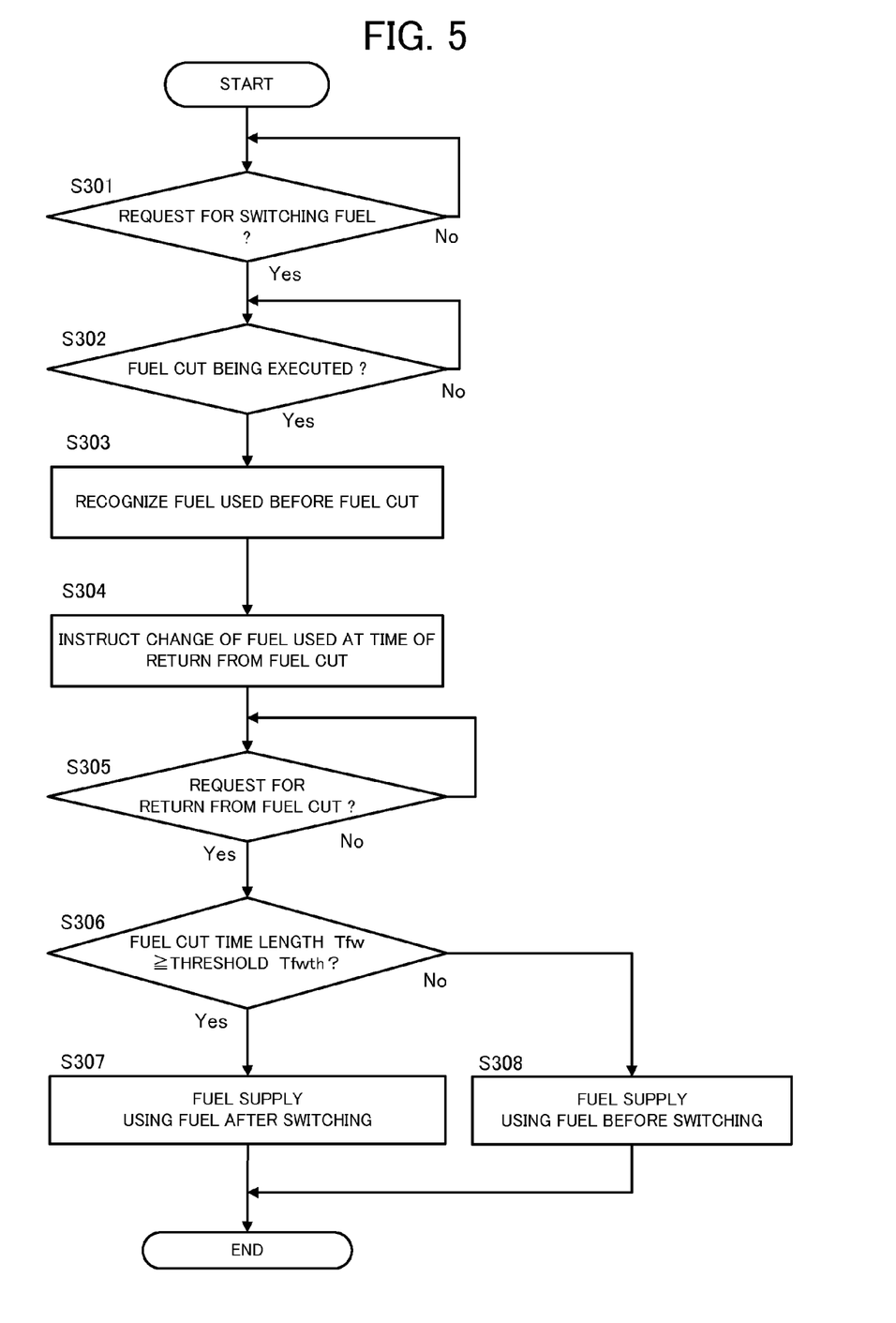
FIG. 5 is an example of a flowchart showing a procedure of the process according to the third embodiment.

Next, a description will be given of a procedure of the process executed by the ECU 50 according to the third embodiment with reference to FIG. 5. FIG. 5 is one example of a flowchart showing the procedure of the process executed by the ECU 50 according to the third embodiment. The ECU 50 repeatedly executes the process of the flowchart shown in FIG. 5 in a predetermined cycle.

First, the ECU 50 determines whether or not switching the fuel is requested (step S301). When the ECU 50 determines that switching the fuel is requested (step S301: Yes), it proceeds with the process at step S302. In contrast, when the ECU 50 determines that switching the fuel is not requested (step S301: No), it continues to monitor whether or not switching the fuel is requested.

Next, the ECU 50 determines whether or not the fuel cut is being executed (step S302). Concretely, based on the present fuel injection quantity and/or the air fuel ratio, the ECU 50 determines whether or not the fuel cut is being executed. When the ECU 50 determines that the fuel cut is being executed (step S302: Yes), the ECU 50 executes the process at step S303 and the following processes. In contrast, when the ECU 50 determines that the fuel cut is not being executed (step S302: No), it continues to monitor whether or not the fuel cut is being executed.

When the ECU 50 determines that the fuel cut is being executed, the ECU 50 recognizes the fuel used before the fuel cut (step S303). Then, the ECU 50 instructs the change of the fuel to be used at the time of the return from the fuel cut (step S304).

Next, the ECU 50 determines whether or not the return from the fuel cut is requested (step S305). When the ECU 50 determines that the return from the fuel cut is requested (step S305: Yes), it proceeds with the process at step S306. In contrast, when the ECU 50 determines that the return from the fuel cut is not requested (step S305: No), it continues to determine whether or not the return from the fuel cut is requested.

Next, the ECU 50 determines whether or not the fuel cut time length Tfw is equal to or longer than the threshold Tfwth (step S306). Concretely, the ECU 50 sets the time length from the time when the ECU 50 determines that the fuel cut is being executed at step S302 from the time when the ECU 50 determines that the return from the fuel cut is requested at step S305 as the fuel cut time length Tfw. Based on the operation state of the internal combustion engine 100 such as the intake air amount, the ECU 50 also calculates the threshold Tfwth with reference to a predetermined map, for example.

When the ECU 50 determines that the fuel cut time length Tfw is equal to or longer than the threshold Tfwth (step S306: Yes), it executes the fuel supply using the fuel after the switching (step S307). Namely, in this case, the ECU 50 determines that the fuel cut time length Tfw is long enough to have no influence caused by the previously-used remaining fuel, and it switches the fuel. Thereby, while preventing the influence caused by the remaining fuel, the ECU 50 can suppress the deterioration of the emission and the deterioration of the drivability due to switching the fuel.

In contrast, when the fuel cut time length Tfw is shorter than the threshold Tfwth (step S306: No), the ECU 50 executes the fuel supply using the fuel before the switching (step S308). Namely, in this case, the ECU 50 cancels the change of the fuel to be used at the time of the return from the fuel cut made at step S304, and it supplies each cylinder 7 with the fuel used before the fuel cut. Thereby, the ECU 50 can suppress the influence of the remaining fuel due to the fact that the fuel cut time length Tfw is too short.

[Modification]

In the explanations of the above-mentioned first to third embodiments, the ECU 50 switches the fuel between CNG and the liquid fuel. However, a method to which the present invention can be applied is not limited to the method.

For example, instead of CNG, the internal combustion engine 100 may store other gas fuel such as LPG (Liquefied Petroleum Gas) and LNG (Liquefied Natural Gas) for the purpose of the fuel supply. In another example, the internal combustion engine 100 may store more than two kinds of fuel for the purpose of the fuel supply. In either case, by switching the fuel around the time of the fuel cut according to the first to third embodiments, the ECU 50 can suppress the deterioration of the emission and the deterioration of the drivability.

BRIEF DESCRIPTION OF THE REFERENCE NUMBER

1*x* First fuel injection valve
1*y* Second fuel injection valve
2 Intake valve
3 Sparking plug
4 Exhaust valve
7 Cylinder
9 Piston
10 Connecting rod
11 Intake passage
12 Throttle valve
13 Surge tank
15 A/F sensor
21 Regulator
50 ECU
100 Internal combustion engine

The invention claimed is:

1. A control device for an internal combustion engine, comprising:
an engine including:
a combustion chamber;
a first injection valve which controls supply of liquid fuel to the combustion chamber; and
a second injection valve which controls supply of gas fuel to the combustion chamber; and
a control unit which controls the first injection valve and the second injection valve to switch the fuel supplied to the combustion chamber between the liquid fuel and the gas fuel,
wherein, when there is a request for switching the fuel, the control unit delays the timing of switching the fuel to a timing around an interruption of fuel supply by the first injection valve and the second injection valve, the interruption being not based on the request for switching the fuel, and
wherein the control unit does not switch the fuel when a continuous time length of the interruption is shorter than a predetermined time length.

2. The control device for an internal combustion engine according to claim 1,
wherein the control unit compulsorily switches the fuel when the interruption has not occurred within a predetermined duration after the request for switching the fuel.

3. The control device for an internal combustion engine according to claim 2,
wherein the predetermined duration is determined based on emission, fuel efficiency and/or remaining amount of the fuel to be consumed, which are estimated based on an operation state of the engine.

4. The control device for an internal combustion engine according to claim 1,
wherein the predetermined time length is determined based on an operation state of the engine.

* * * * *